Nov. 3, 1964
T. J. WEIR
3,155,209
FLUID COUPLING DEVICE
Filed April 19, 1962
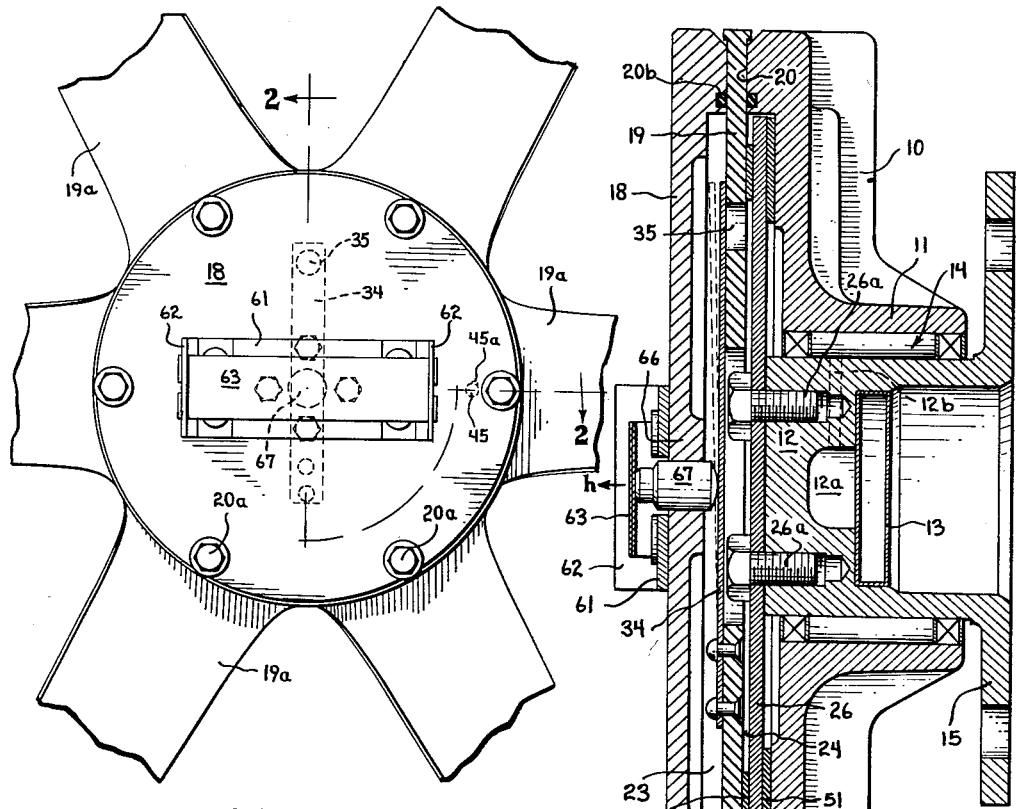
Fig. 1.
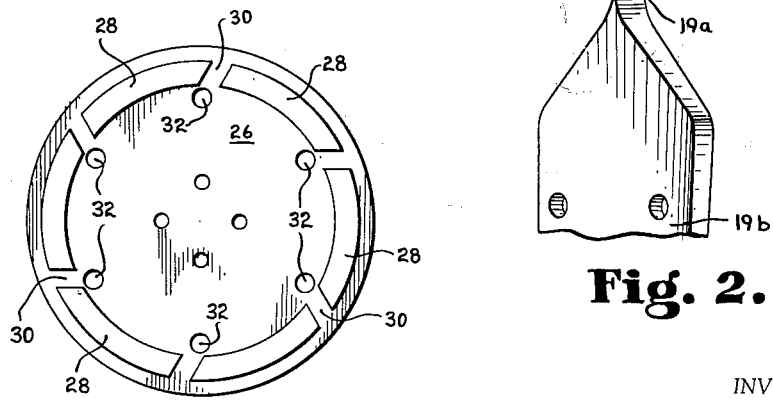
Fig. 2.
Fig. 3.
INVENTOR.
THOMAS J. WEIR
BY
Lockwood, Woodard, Smith & Weikart
Attorneys United States Patent Office 3,155,209
Patented Nov. 3, 1964

3,155,209
FLUID COUPLING DEVICE
Thomas J. Weir, Indianapolis, Ind., assignor to Schwitzer Corporation, Indianapolis, Ind., a corporation of Indiana
Filed Apr. 19, 1962, Ser. No. 188,743
1 Claim. (Cl. 192—58)

This invention relates generally to fluid coupling devices, and more particularly, to a fluid coupling adapted to drive an accessory device, such as a cooling fan, for an internal combustion engine, the coupling being responsive to such parameters as temperature, input speed or the like.

Automotive vehicles, such as passenger automobiles and buses are being provided with air conditioning equipment, the condensing element of such equipment being mounted in front of the cooling radiator of the engine. The air flowing through the condensing element is heated thereby and then flows through the cooling radiator of the engine, thereby effecting the cooling characteristics of the radiator. Accordingly, the size of the cool-fan and its speed of rotation have been increased to provide adequate volume of cooling air. As a result, the parasitic load on the engine has been increased and the noise of fan operation has risen to an objectionable level.

To compensate for these effects the cooling fan of the engine is provided with a fluid coupling device having temperature responsive means controlled either by the temperature of the air flowing through the radiator or by the temperature of the water circulating through the engine cooling system. The degree of coupling between the fan and the engine is controlled by the temperature responsive means to provide substantially direct coupling of the fan to the engine when the air or the cooling water is at relatively high temperatures and to effect a certain degree of slip within the coupling to drive the fan at lower than normal speeds when the temperature of the air or cooling water is relatively low. These temperature variable couplings have the advantage of decreasing the power supplied to the fan by the engine when less air is needed for cooling purposes. This type of variable coupling also results in a minimum of fan noise since the fan speed is reduced except when necessary to provide proper heat exchange.

In my copending patent applications Serial No. 165,-527, filed January 11, 1962, titled "Speed Responsive Coupling Device" and Serial No. 249,704 filed January 7, 1963, titled "Temperature and Speed Responsive Fluid Coupling," there are disclosed and claimed fluid coupling devices of the type disclosed in this application. The inventive concept of the present application relates to certain structural improvements over those of my copending applications which provide advantages in manufacture and improved heat dissipation from the interior of the coupling.

The primary object of the present invention is to provide a condition responsive fluid coupling device in which an output element, such as a fan spider, functions to provide the dividing wall establishing fluid chambers within the device and thereby providing improved heat dissipation from the interior of the coupling device.

A further object of the present invention is to provide a coupling device for a fan wherein the external housing casting is simplified and the fan spider not only serves to support the fan blades but also forms one of the interior components of the coupling.

These and other objects will become apparent as the description proceeds with reference to the accompanying drawings in which:

FIG. 1 is a front view of a coupling device embodying the present invention.

FIG. 2 is a side sectional view taken generally along the line 2—2 of FIG. 1.

FIG. 3 is a side elevation, in reduced scale, of the drive disc taken from the left side of FIG. 2.

Referring to the drawings, the invention is embodied in a fluid coupling unit comprising a casing member 10 having a hub portion 11 for rotatably mounting the casing on a drive shaft 12. The drive shaft 12 is provided with an internal cavity 12a which can be filled with grease or similar lubricant and which is directed radially outwardly through radial passages 12b. The passages 12b supply lubricant to a conventional sealed bearing assembly 14 for supporting the casing on the shaft. A grease retainer 13 closes the open face of the cavity 12a. Shaft 12 may be provided with a coupling flange 15 for coupling the drive shaft to any conventional rotating part of an internal combustion engine. A conventional arrangement for a fan drive coupling would connect the flange 15 to the pulley which drives the engine water pump.

The casing member 10 is provided with a cover member 18, the outer peripheral portion of which engages a plate 19 (FIG. 2) which is seated against an annular surface 20 formed adjacent the periphery of the casting 10. The cover member 18, the plate 19 and the casting 10 are held in assembled relation by means of bolts 20a and sealing rings 20b provide a seal for the interior of the assembly. It will be noted that the plate 19 is apertured at its central area and has integral arms 19b extending exteriorly of the casing which are adapted to support fan blades (not shown) bolted or otherwise secured to the portion 19b of the arms 19a. The plate 19 and its integral arms 19a form a fan spider, the flat central portion of which spans the interior of the casing. The cover member 18 is formed and mounted to establish a spaced relation with respect to the plate 19 thus providing a fluid reservoir 23 between the cover member 18 and the plate 19. The casing member 10 is formed to provide a recess inwardly of plate 19 to thereby provide a drive chamber 24 within which is mounted the drive disc 26. As may best be seen in FIG. 2, the drive disc 26 is bolted by means of bolts 26a to the end face of the shaft 12. The drive disc 26 thus rotates with the shaft 12.

The peripheral portions of the disc 26 are covered with arcuate facing members 28 and 51 which may be spaced from each other as shown in FIG. 3 to provide grooves or channels 30 extending between the outer portion of the facing members 28 and 51 inwardly the entire width of the facing members. Grooves 30 (FIG. 3) provide torodial circulation of fluid because of the provision of ports 32 located at the inner ends of each of the grooves 30. This means of providing toroidal circulation of fluid is fully described in my United States Letters Patent No. 2,879,755 granted March 31, 1959.

Controlling the flow of fluid from reservoir 23 into the drive chamber 24 there is provided an elongated valve member 34 extending at its outer end over an aperture or port 35 in the plate 19. While the valve member could be secured to the cover member 18, it is here disclosed as riveted or otherwise secured to the face of the plate 19. The member 34 is somewhat resilient and is provided with an inherent bias away from the plate 19 so that when unstressed it assumes a position approximating that shown in broken lines in FIG. 2.

Mounted on the exterior face of the cover member 18 is a generally U-shaped bracket 61 having outwardly extending portions 62 at each of its extremities. The central section of each of these outwardly turned portions 62 is cut away to accommodate the tips of a thermally responsive means in the form of a bimetal strip 63. The bimetal strip is arranged so that its high expansion side faces outwardly. When so arranged it will be evident that upon an increase in temperature ambient to the bimetal strip, the central portion of the strip will bow outwardly as indicated by the arrow in FIG. 2. Beneath the center of the bimetal strip the cover member 18 is apertured and the area surrounding the aperture is thickened as indicated at 66. This thickened portion encircles a thrust member 67 which at one end bears against the inner face of the bimetal strip 63 and at its other end engages the valve member 34. As will be evident from FIG. 2, the arrangement of the bimetal strip 63 with relation to the thrust member is such that the bimetal strip mechanically exerts a force on the valve member 34 which is sufficient to seat the valve member against the port 35 and to overcome the opposing force of the inherent bias in the valve member. The force exerted by the bimetal strip tending to move the valve member 34 into seating relation with the port 35 is thus inversely proportional to the temperature ambient to the bimetal strip.

It will be understood that the rotational speed of the casing provided by the casing member 10 and the cover member 18, as compared to the rotational speed of the shaft 12, that is, the degree of coupling between the two, is dependent upon the amount of fluid in the chamber 24. The volume of fluid in the chamber 24 is dependent on the rate of flow of fluid from the reservoir 23 through the port 35. Means are provided permitting the flow of fluid out of the chamber 24 and this means includes an aperture 45 in the plate 19 adjacent the periphery thereof. As will be evident from FIG. 1 the aperture 45 is not completely circular but includes an additional aperture portion 45a which is semi-circular in cross-section and provides communication between the chamber 24 and the reservoir 23. Freely movable within the aperture 45 is a cylindrical block 46 formed of wear resistant material. The member 46 is urged into engagement with the adjacent side face of the drive disc 26 by means of a small compression spring 46a which extends between the cover member 18 and a seat in the block 46. Fluid may flow from the reservoir 23 through the port 35 when it is open and into the chamber 24. Fluid may flow from the chamber 24 through the aperture portion 45a back into the reservoir 23. The block 46, spring biased into engagement with the adjacent face of the drive disc 26, serves to force fluid flow through the aperture portion 45a. It will be noted that the facing members 28 which are opposite the inner surface of the plate 19 do not extend all the way to the circumferential edge of the disc 26 leaving a space on the disc surface wherein the member 46 may directly engage the disc. Upon rotation of the case centrifugal force causes the fluid in the drive chamber 24 to collect in the area in front of the block 46 creating pressure sufficient to force the flow of fluid through the aperture portion 45a.

In operation, reservoir 23 may be filled with a fluid such, for example, as an oil to a degree sufficient to fill the spaces in chamber 24 between the opposing surfaces of the facings 28 and 51 and the adjacent walls of plate 19 and casing 10. Sufficient fluid is also required to maintain the same level in reservoir 23 as that in chamber 24 during operation of the coupling. With the drive shaft 12 rotating with the engine, at relatively low temperatures, of the order of 100° F., the valve port 35 will be substantially closed by the valve member 34. Under these conditions the fluid within the chamber 24 will accumulate in the peripheral portion of the chamber and flow through the port 45 into reservoir 23. Since only a minimum amount of fluid then will remain in the chamber 24 the degree of coupling between the drive disc 26 and the fan spider 19 will be relatively small, resulting in low output or fan speed. At these relatively low temperatures, the mechanical strength of the bimetal strip 63 is sufficient to overcome the inherent bias of the valve member 34. As the temperature increases, the force exerted by the bimetal strip 63, tending to urge the valve member toward closed position, is reduced. As this force is reduced, the inherent bias of the valve member 34 begins to open the port 35. As the temperature continues to rise the force exerted by the bimetal strip 63 in port closing direction continues to decrease. With the opening of the port 35 the output speed increases, that is, the speed of the casing and the fan spider 19 increases. The degree of coupling of the fan and the input or drive shaft is thus increased as the temperature affecting the thermally responsive element increases thereby increasing fan speed. Upon a decrease in temperature, the reverse action takes place.

It will be noted that by having the plate 19 function also as a fan spider, that is, by providing the plate 19 with integral arms extending exteriorly of the casing for supporting the fan blades, the blade arms need not be cast into the casing member 10. Further, by utilizing the fan spider as the separating plate dividing the interior of the casing into a reservoir and a drive chamber, since the fan blade arms and the separating plate are integral, good heat conduction is secured from the inside of the casing to the exterior thereof and this heat may be readily dissipated from the fan arms and blades thus maintaining a relatively low temperature within the coupling assembly.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

A fan drive coupling device comprising a drive shaft, an outer casing rotatably mounted on said shaft, a fan spider element having a flat central portion spanning the interior of said casing and having integral fan blade supporting arms disposed exteriorly of said casing, said central portion of said element separating the space within said casing into a fluid reservoir and a drive chamber, a drive disc mounted on said shaft within said drive chamber, said drive disc having surfaces disposed in close face-to-face and spaced relation with surfaces of said element central portion and said outer casing, fluid within said reservoir, means for controlling the flow of fluid from said reservoir to said drive chamber upon rotation of said drive shaft to thereby provide a fluid drive coupling of said casing and said disc with the degree of coupling being dependent on the volume of fluid in said drive chamber, the heat generated within said fluid upon operation of said coupling device being transferred to the exterior of said casing through said spider element and dissipated from said blade supporting arms.

References Cited in the file of this patent
UNITED STATES PATENTS 2,902,127     Hardy _____ Sept. 1, 1959
3,088,566     Fleming _____ May 7, 1963